(12) United States Patent
Harrison

(10) Patent No.: US 6,731,690 B2
(45) Date of Patent: May 4, 2004

(54) METHODS AND APPARATUS FOR TRANSMULTIPLEXING A MULTI-CHANNEL SIGNAL

(75) Inventor: Robert Mark Harrison, Grapevine, TX (US)

(73) Assignee: Motorola, Inc., Schaumburg, IL (US)

( * ) Notice: Subject to any disclaimer, the term of this patent is extended or adjusted under 35 U.S.C. 154(b) by 739 days.

(21) Appl. No.: 09/727,558

(22) Filed: Dec. 1, 2000

(65) Prior Publication Data

US 2002/0106009 A1 Aug. 8, 2002

(51) Int. Cl.[7] .......................... H04L 27/28; H04L 27/06; H04J 4/00
(52) U.S. Cl. ...................... 375/260; 375/316; 375/340; 370/307
(58) Field of Search .................................. 375/260, 316, 375/340, 350, 377; 370/307, 343, 347, 478, 480, 481, 498, 536, 542, 916, 210

(56) References Cited

U.S. PATENT DOCUMENTS

| | | | |
|---|---|---|---|
| 4,241,443 A | * 12/1980 | Sakaki et al. | 370/307 |
| 5,323,391 A | * 6/1994 | Harrison | 370/347 |
| 5,490,172 A | * 2/1996 | Komara | 375/296 |
| 5,710,763 A | * 1/1998 | Harrison | 370/307 |
| 5,926,455 A | * 7/1999 | Allpress | 375/350 |

\* cited by examiner

*Primary Examiner*—Betsy L. Deppe
(74) *Attorney, Agent, or Firm*—L. Bruce Terry; Lalita Pace; Frank J. Bogacz

(57) ABSTRACT

A transmultiplexer (202) is provided for transmultiplexing digitized signal samples (244) produced by a converter. The transmultiplexer (202) comprises a first Fourier transformer bank (304) configured to transform the digital signal samples (244) produced by the digitizer into frequency domain input signals (320). The transmultiplexer (202) also comprises a frequency domain shifter bank (306) configured to circularly shift the frequency domain input signals (320) to produce shifted signals (324). A frequency domain prefilter bank (308) is configured to perform a first fast convolution with the shifted signals (324) and a first discrete Fourier transform of a first filtering function to produce filtered input signals (330), and a combining Fourier transformer (310) is configured to transform the filtered input signals (330) to produce output signals (348) containing a sample corresponding to a down-converted channel.

20 Claims, 4 Drawing Sheets

FIG. 1 — PRIOR ART —

METHODS AND APPARATUS FOR TRANSMULTIPLEXING A MULTI-CHANNEL SIGNAL

FIELD OF THE INVENTION

The present invention generally relates to communications systems, and more particularly to methods and apparatus for transmultiplexing a multi-channel communication signal in a multi-channel transceiver.

BACKGROUND OF THE INVENTION

There are numerous advantages to implementing a communications system using digital techniques. For example, there are enhanced system capacity, and reduced noise, hardware and power consumption. In communications systems having a multi-channel communication signal, multi-channel transceivers with transmultiplexers are utilized to recover individual communication channels from the multi-channel communication signal. Such a multi-channel transceiver 100 having a transmultiplexer 102 is shown in FIG. 1 according to the prior art.

The multi-channel transceiver 100 shown in FIG. 1 is configured as a receiver for illustrative purposes. However, it should be appreciated that operated in reverse, this multi-channel transceiver 100 operates to process multiple channels for transmission as a multi-channel radio frequency (RF) signal. As a receiver, the transceiver 100 receives multi-channel RF signals with an antenna 104, transducer 106, bandpass filter 108, mixer 110, intermediate frequency (IF) filter 112, baseband mixer 114, filter 116, analog-to-digital (A/D) converter 118 and mixer 120.

The mixer 120 mixes the digitized signal output 122 of the A/D converter 118 with a complex sinusoid of the form $$e^{\frac{j2\pi k F_0}{F_s}},$$

where $F_s$ is the A/D sample frequency, $F_0$ is the frequency shift, and k is the time index. This frequency shift is often used to translate a selected frequency channel such that it is centered at 0 Hz. Therefore, we refer to this operation as channel centering. This channel centering operation creates a digitized and centered multi-channel signal 124, which is operatively coupled to the transmultiplexer 102 by commutator 126. The transmultiplexer 102 converts the digitized and centered multi-channel signal 124 to a baseband signal using a fast Fourier transformer 128 operating on the outputs of polyphase filters 130, and equalizes and/or matched filters each of the down-converted channels of the fast Fourier transformer 128 using equalizers 132 and/or matched filters 134, respectively. The resulting outputs 136 of the transmultiplexer 102 are multiple communications channels separated from the digitized and centered multi-channel signal 124 originally presented to the inputs 138 of the transmultiplexer 102.

As may be appreciated from the foregoing description of the prior art, the transmultiplexer 102 requires channel centering to avoid additional computations caused by down converting both the positive and negative images of the channels in the real-valued input signal. The channel centering operations result in complex valued signals that are presented to the transmultiplexer for channel signal conversion, thereby increasing computational requirements as compared to a transmultiplexer conversion of real value inputs. Furthermore, the polyphase filtering, equalization and matched filtering of the prior art transmultiplexer does not utilize fast Fourier transform (FFT) filtering and fast convolution to improve computational efficiency.

In view of the foregoing, is should be appreciated that it would be desirable to provide transmultiplexing methods and apparatus for use with digital transceivers that reduce channel duplication. In addition, it should be appreciated that it would be desirable to provide transmultiplexing methods and apparatus with improved computational efficiency. Furthermore, additional desirable features will become apparent to one skilled in the art from the following detailed description of a preferred exemplary embodiment and appended claims.

BRIEF DESCRIPTION OF THE DRAWINGS

The present invention will hereinafter be described in conjunction with the appended drawing figures, wherein like numerals denote like elements, and.

DETAILED DESCRIPTION OF A PREFERRED EXEMPLARY EMBODIMENT

The following detailed description of a preferred exemplary embodiment is directed to a communication unit for use in a cellular or personal communications system (PCS). However, the principles discussed herein can be readily applied to other wire based, radio, cable television (CATV) telephony or satellite telecommunication systems, as well as data communications systems, without departing from the spirit and scope of the present invention. Furthermore, while the following exemplary embodiment is presented as a receiver, it should be understood that a reverse operation by the following apparatus and methods may process multiple channels for transmission as a multi-channel RF signal (i.e., operates as a multi-channel transmitter).

Figure 1:
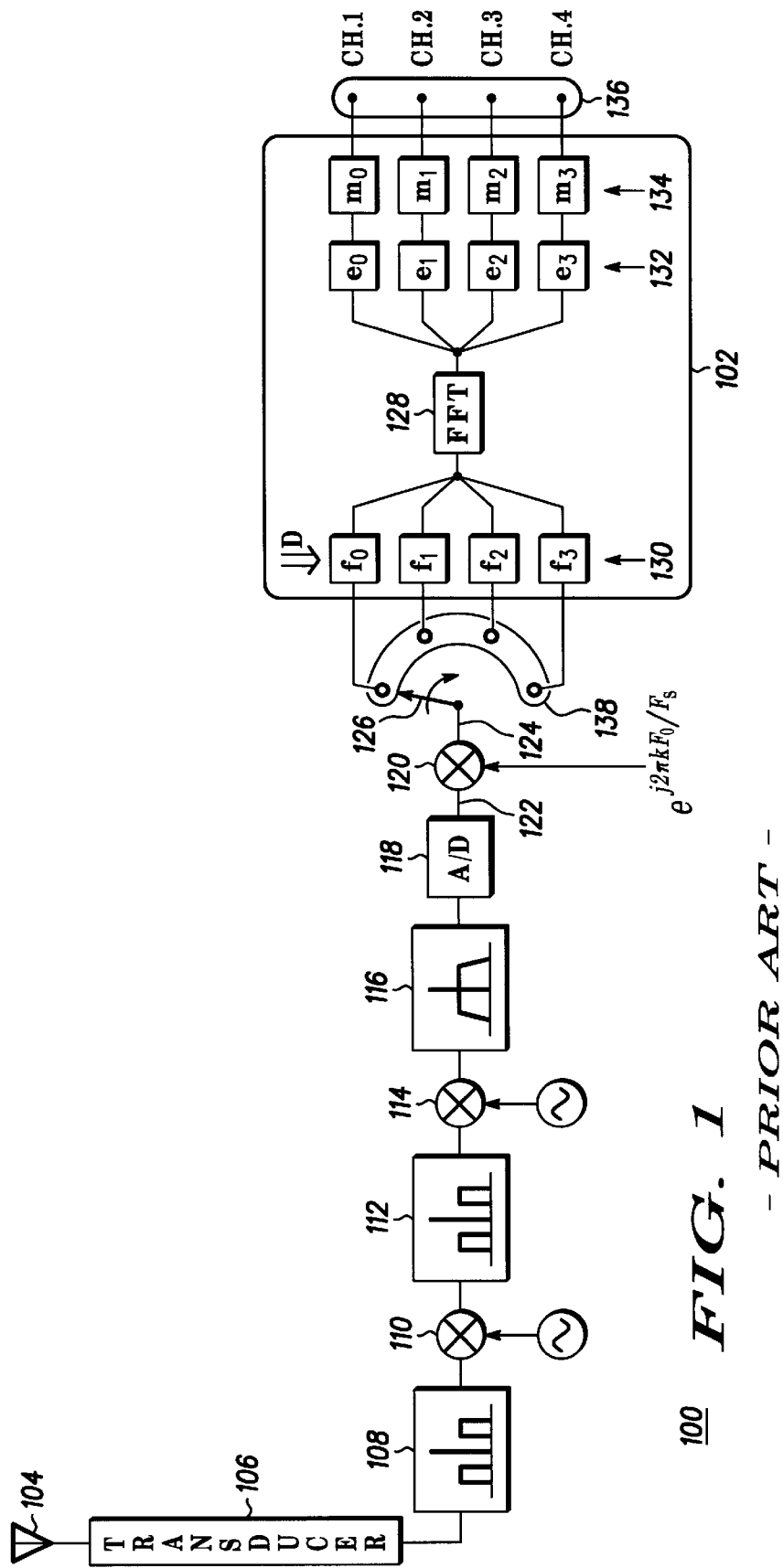
FIG. 1 is a block diagram of a multi-channel digital receiver according to the prior art.
Figure 2:
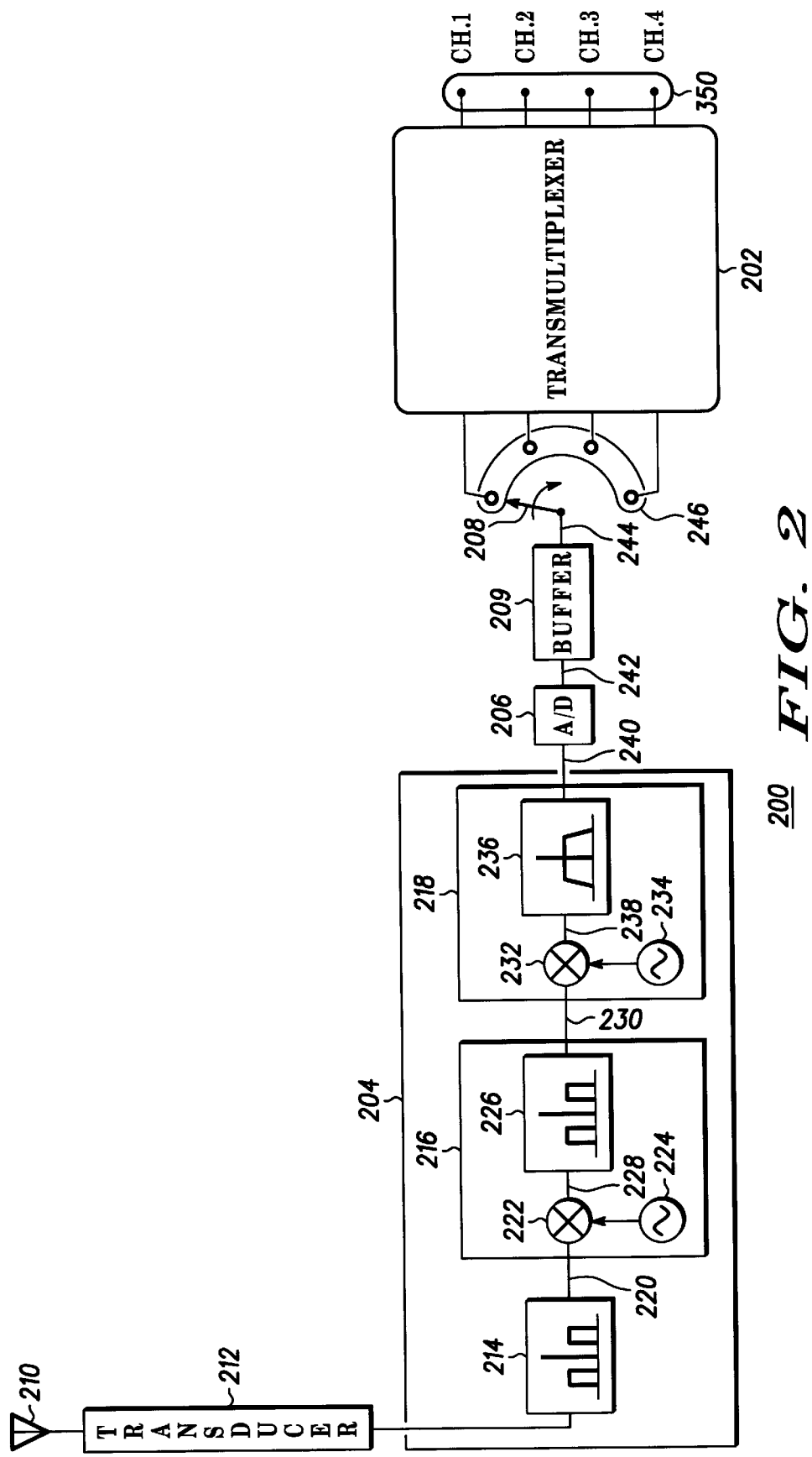
FIG. 2 is a block diagram of a multi-channel receiver in accordance with a preferred exemplary embodiment of the present invention.

FIG. 2 illustrates a multi-channel receiver 200 having a transmultiplexer 202 according to a preferred exemplary embodiment of the present invention. In addition to the transmultiplexer 202, the receiver 200 preferably, but not necessarily, includes an analog signal preprocessor 204, analog-to-digital (A/D) converter 206, commutator 208, buffer 209 and antenna 210.

The antenna 210 is configured to intercept electromagnetic radiation within a selected frequency band. The antenna 210 may be any number of electromagnetic interception devices, including, but not limited to, a wave guide, a coaxial cable, an optical fiber or an infrared frequency transducer. The electromagnetic radiation intercepted by the antenna 210 is converted to an analog electrical signal with a transducer 212, and presented to the analog signal preprocessor 204. The analog signal preprocessor 204 has a preselect bandpass filter 214, a first down-converter 216 and second down-converter 218, which preferably provides a low noise figure and protection against undesired out-of-band signals.

In order to provide the low noise figure and protection for undesired out-of-band signals, the output electrical signal 220 of the preselect bandpass filter 214 is presented to a first down-converter 216. The first down-converter 216 has a mixer 222, a local oscillator 224 and a bandpass filter 226. Preferably, the local oscillator 224 is a fixed frequency oscillator. However, any number of oscillator variations may be used for the fixed frequency oscillator, including a variable frequency oscillator.

The local oscillator 224 is operatively coupled to the mixer 222. The mixer 222 down-converts the output electrical signal 220 of the preselect bandpass filter 214 to an intermediate frequency (IF) band electrical signal 228 that is filtered by the bandpass filter 226 to reduce undesired frequency components. A conditioned IF band electrical signal 230 is generated by the bandpass filter 226 and provided to a second down-converter 218 for additional processing.

The second down-converter 218 includes a mixer 232, a local oscillator 234 and a low pass filter 236. The mixer 232 is operatively coupled to the local oscillator 234 and the output of the first down-converter 216. The mixer 232 down-converts the conditioned IF band electrical signal 230 to a baseband electrical signal 238, which is filtered by the low pass filter 236 to produce a conditioned baseband electrical signal 240, which generally lacks undesired frequency components.

The conditioned baseband electrical signal 240 is preferably coupled to the A/D converter 206 for conversion of a portion of the conditioned baseband electrical signal 240 into a digitized signal 242 representing the electromagnetic radiation within the intercepted frequency band, and containing multiples channels (i.e., N channels) in frequency-divided passbands. In this detailed description of a preferred exemplary embodiment, the digitized signal 242 has four channels (i.e., N=4). However, it should be understood that the present invention is applicable to any number of channels. The sampling rate of the A/D converter 206 is preferably selected to be at least twice the highest desired frequency within the conditioned baseband electrical signal 240 in order to satisfy the Nyquist criteria. The digitized signal 242 is preferably presented to the buffer 209 for storage until the transmultiplexer 202 is ready to process new samples.

The commutator 208 receives the real-valued digitized signal samples 244 from the buffer 209 and operatively couples the real-valued digitized signal samples 244 to the inputs 246 of the transmultiplexer 202. The commutator 208 distributes portions of the real-valued digitized signal samples 244 to the inputs 246 at a first sampling rate ($F_s$), such that each of the inputs 246 receives a portion of the real-valued digitized signal samples 244 at a second sampling rate of ($F_s/N$) for digital frequency conversion.

Figure 3:
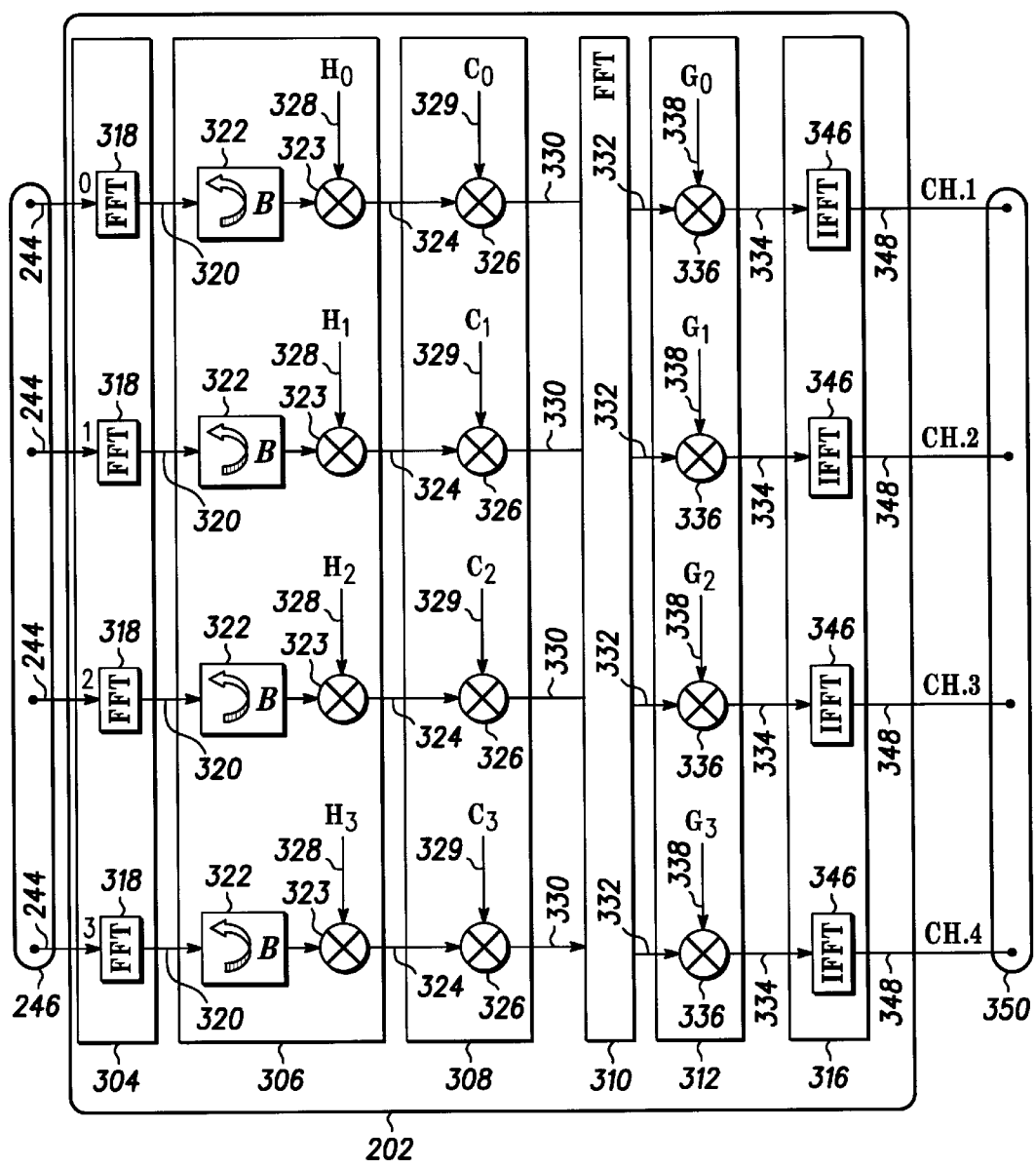
FIG. 3 is a block diagram of a transmultiplexer for use with the multi-channel receiver of FIG. 2 according to a preferred exemplary embodiment of the present invention.

Referring to FIG. 3, the transmultiplexer 202 of FIG. 2 is shown in greater detail. The transmultiplexer 202 includes a fast Fourier transform (FFT) bank 304, a frequency domain shift bank 306, a frequency domain pre-filter bank 308, a combining FFT 310, a frequency domain post-filter bank 312 and an inverse FFT bank 316. Each of these transmultiplexer banks (304, 306, 308, 310, 312, 316) contains four branches. However, it should be understood that the principles of the present invention may be applied to more or less branches in any of the banks (304, 306, 308, 310, 312, 316).

As previously provided, the real-valued digitized signal samples 244 are received at the inputs 246 of the transmultiplexer 202 for down-conversion and channel separation. The transmultiplexer 202 begins the digital frequency conversion by transforming each of the real-valued digitized signal samples 244 at each of the inputs 246 from the time domain to the frequency domain with one of the fast Fourier transformers 318 forming the fast Fourier transformer bank 304. Once each of the real-valued digitized signal samples 244 is transformed to the frequency domain, the frequency domain input signals 320 produced by each of the fast Fourier transformers 318 is frequency shifted by the frequency domain shift bank 306, which is preferably a frequency domain circular shift bank.

The shifting of the frequency domain input signals 320 produced by each of the fast Fourier transformers 318 is conducted with circular shifters 322 and phase correction multipliers 323. A circular shift of a given number (B) of frequency bins of an FFT having a given length (L) circularly shifts the signal in frequency by (B/L)*$F_b$ Hertz (Hz), where $F_b$ is the sample rate of the branch containing the FFT. For example, in order to shift the frequency of the frequency domain input signals 320 by a factor of Fs/16, where Fs is the sample rate of the buffer output and the A/D converter, a circular shift of $$B = \frac{LNF_0}{F_s} = \frac{L}{4}$$

FFT frequency bins is desirable for the appropriate shift.

While circular shifting alters the frequency of the frequency domain input signals 320, the phase correction multipliers 323 most preferably set the relative phase of each branch. The phase correction terms ($H_k$) 328 of the phase correction multipliers 323 can be expressed as:

$$H_k = e^{\frac{j2\pi k F_0}{F_s}} \quad (1)$$

Where $F_0$ is the desired centering frequency, k is the index of the branch, and the phase correction term ($H_k$) 328 associated with the $k^{th}$ branch is preferably a single, time invariant and complex number for a given centering frequency. For example, the phase correction term ($H_k$) 323 of the $k^{th}$ branch is provided with $e^{j\pi k/8}$ for a frequency shift of $F_0=F_s/16$. Alternatively, the phase correction term ($H_k$) 323 can be partially or completely eliminated from the frequency domain shift bank 306 by multiplying some or all of the polyphase filter branches ($C_k$) 329 of the frequency domain pre-filter bank 308 by the corresponding phase correction term ($H_k$) 323. (Note that each phase correction term ($H_k$) 328 is preferably used on input branch k of transmultiplexer 202). As should be appreciated, this circular shift operation provides channel centering, while allowing the inputs to the transmultiplexer 202 to be real-valued inputs. Since FFT operations on real-valued signals typically necessitates about half of the computations than FFT operations on complex valued signals, the use of the circular shifters 322 reduces the FFT computations of the transmultiplexer 202 by about a factor of two.

The shifted signals 324 produced by the frequency domain circular shift bank 306 are subsequently presented to the frequency domain pre-filter bank 308. The elements of the frequency domain pre-filter bank 308 consist of a multiplier 326 having two inputs. One input of the multiplier 326 receives one of the shifted signals 324 and the second input of the multiplier 326 receives the discrete Fourier transform of a polyphase filter branch ($C_k$) 329. The polyphase filter branches ($C_k$) 329 operate in the frequency domain and in parallel as a single polyphase filter, and the polyphase filter impulse response can be designed using any number of techniques to perform channel separation. The polyphase filter formed of the transformed polyphase filter branches ($C_k$) 329 provide a low pass filter designed to preferably attenuate undesired frequency components and to reduce aliasing in the down-conversion process. Preferably, the polyphase filter has a bandwidth less than the sample rate of the output channels 350 in order to minimize aliasing in the down-conversion process. The transformed polyphase filter branches ($C_k$) 329 are preferably discrete Fourier transforms of decimated versions of the polyphase filter. (See, R. Crochiere and L. Rabiner, "Multirate Digital Signal Processing," Prentice Hall, 1983, pp. 303–310, for a description of the use of polyphase filter banks in transmultiplexers, which is hereby incorporated by reference.) The transformed polyphase filter branches ($C_k$) 329 and the circularly shifted signals 324 are multiplied by the multipliers 326 of the frequency domain pre-filter bank 308, thereby providing a fast convolution filtering operation, which produces filtered input signals 330 that are presented in parallel as the input to the combining FFT 310.

The combining FFT 310 transforms the filtered input signals 330 produced from the frequency domain pre-filter bank 308. Preferably, the combining FFT 310 generates output signals 332 with an N-point Fourier transform for each of the N channels (i.e., N=4 in this illustrative description), which are presented to the frequency domain post-filter bank 312 for additional processing. Each of the transformer output signals 332 of the combining fast Fourier transformer 310 preferably contains samples corresponding to one of the down-converted channels. These samples of the discrete Fourier transform of one of the down-converted channels are preferably equalized and/or matched filtered with the frequency domain post-filter bank 312.

More specifically, the output signals 332 of the combining FFT 310 are provided as an input to a multiplier 336 of the frequency domain post-filter bank 312. The second input of the multiplier 336 receives the discrete Fourier transform of a post-filtering function ($G_n$) 338, which provides baseband filtering, such as equalization and/or matched filtering, or the like. The post-filtering functions ($G_n$) 338 preferably provide filtering that is adaptable to the $n^{th}$ down-converted channel, and can be designed by determining the desired filter coefficients, computing the filter impulse response, and taking the discrete Fourier transform thereof. Alternatively, if a desired frequency response is known, the desired frequency response can be used for the post-filtering functions ($G_n$) 338. The discrete Fourier transform of post-filtering functions ($G_n$) 338 and the transformer output signals 332 are multiplied by the multipliers 336, thereby providing a fast convolution post-filtering operation, which produces the post-filtered outputs 334.

The post-filtered outputs 334 of the frequency domain post-filter bank 312 are provided to the inverse FFT (IFFT) bank 316 having multiple inverse FFTs 346 for conversions from the frequency domain to the time domain. This inverse transformation substantially completes the down-conversion process, and produces baseband information signals 348, which can be any type of information including, but not limited to, voice and/or data, that are suitable for analog or digital demodulation, decoding, or other similar processes. The baseband information signals 348 provided at the transmultiplexer channel outputs 350 may be detected with any number of techniques, depending upon the particular signal coding and channelization standard. For example, the transmultiplexer channel outputs 350 may be convolutionally decoded, maximum likelihood sequence estimated, or vocoded to retrieve the information contained in the channel outputs 350.

As should be appreciated, many configurations of the transmultiplexer 202 exist that do not include one or more of the pre-filtering and post-filtering banks. When the frequency content of the baseband signals is of interest, the transmultiplexer 202 may omit the IFFT operation. In addition, many configurations exist that include additional signal processing, including, but not limited to decimation.

Figure 4:
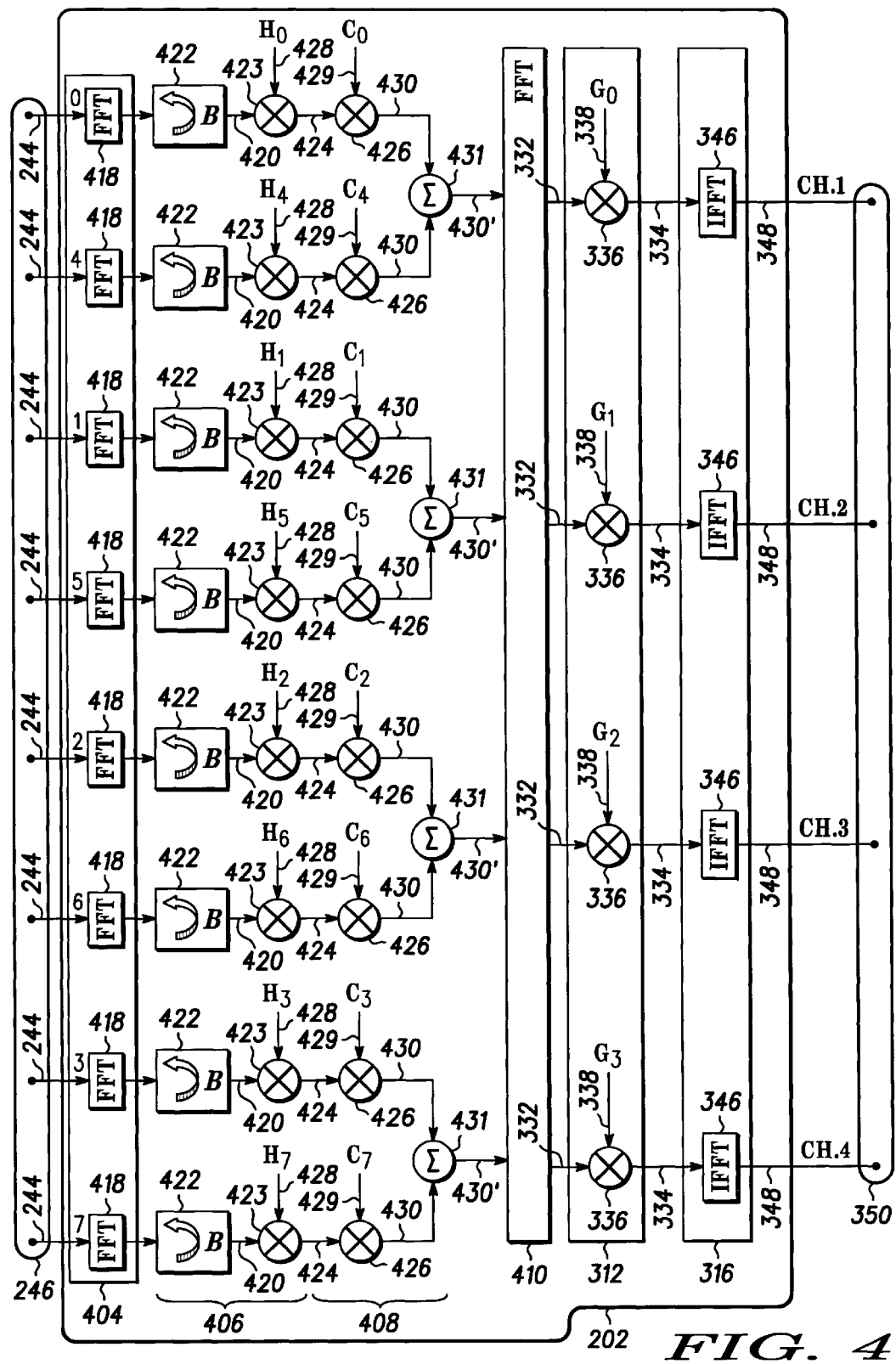
FIG. 4 is a block diagram of a decimating transmultiplexer for use with the multi-channel receiver of FIG. 2 according to a preferred exemplary embodiment of the present invention.

For example, FIG. 4 shows an alternate embodiment of a transmultiplexer 202 of FIG. 2 having decimation according to a preferred exemplary embodiment of the present invention. This embodiment alters the sample rate by a factor other than the number of channels. With reference to FIG. 4, the transmultiplexer 202 that is illustrated reduces the sample rate by an additional factor of two, producing outputs 348 with sample rates at one-eighth the sample rate of the input to the transmultiplexer. However, the transmultiplexer 202 can be configured to reduce the sample rate by any number of factors. In this illustrative example, there are eight inputs 246 to the transmultiplexer 202, and these eight inputs 246 receive samples from the commutator 208 (FIG. 2). The inputs 246 to the transmultiplexer 202 are labeled such that the $l^{th}$ input is labeled with a branch index (k), which is computed as:

$$k = N(l \bmod D) + \left\lfloor \frac{l}{D} \right\rfloor \qquad (2)$$

Where D is the additional decimation factor, ($l \bmod D$) indicates modulo division (i.e., the remainder after dividing integer one by integer D), and $$\left\lfloor \frac{l}{D} \right\rfloor$$

is the largest integer less than or equal to $$\frac{l}{D}.$$

The commutator 208 (FIG. 2) distributes input samples to the transmultiplexer 202 in the order matching the branch index (k). As previously described with reference to FIG. 3, the real-valued digitized signal samples 244 received at the inputs 246 are discrete Fourier transformed with a Fourier transform bank 404 and frequency shifted with a frequency domain shift bank 406. However, the commutator 208 (FIG. 2) is configured to distribute real-valued digitized signal samples 244 to twice as many inputs 246 as compared to FIG. 3, and the sample rate at the inputs 246 is half of the rate as described with reference to FIG. 3. Therefore, assuming the FFT length (L) is the same as for the transmultiplexer 202 of FIG. 3, the frequency domain shift bank 406 is configured to shift by a factor of two greater than the frequency domain shift bank 306 of FIG. 3, and a circular shift of one-half the number of samples is needed as compared to the one-quarter shift in the transmultiplexer 202 of FIG. 3.

As previously discussed with reference to FIG. 3, the circularly shifted signals 420 are multiplied with the phase correction terms ($H_k$) 428 and functions provided by the transformed polyphase filter branches ($C_k$) 429 of the polyphaser filter bank 408. As previously discussed, the phase correction multipliers ($H_k$) 428 compensate for any incompleteness in the frequency centering performed in the circular shifters 422. The transformed polyphase filter branches ($C_k$) 429 are preferably constructed from a low pass filter in the same or similar fashion as previously described with reference to FIG. 3, except that the low pass filter is decimated by an increased factor of two to produce twice as many filter branches. Therefore, the polyphase filter is decimated by a factor of eight in this illustrative example. As in the preferred exemplary embodiment of FIG. 3, the discrete Fourier transform of the $k^{th}$ decimation phase of the polyphase low pass filter is used as the transformed polyphase filter branch ($C_k$) 429 in the $k^{th}$ input branch of the transmultiplexer 202. The bank of summers 431 pair-wise combine the outputs 430 of the multipliers 426, and reduce the sample rate of the branches by a factor of two to one eighth the transmultiplexer sample rate. The combined outputs 430' are combined with combining FFT 410. Once the combined outputs 430' are combined with combining FFT 410, an optional baseband filtering is performed in the frequency domain with the post filtering banks 312, and the signals are transformed into the time domain with an inverse FFT bank 316 as previously discussed with reference to FIG. 3.

As may be appreciated from the foregoing detailed description of a preferred exemplary embodiment, many desirable features of the present invention will become apparent to one skilled in the art from the foregoing detailed description. These features include, but are not limited to, decreased channel duplication with increased computational efficiency and flexible channel centering. In addition, the foregoing detailed description of a preferred embodiment of the invention has only been presented for the purpose of illustration and description. Therefore, this detailed description of a preferred exemplary embodiment is not intended to be exhaustive or to limit the invention to the precise form disclosed herein. Modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular contemplated use. All such modifications and variations are within the scope of the invention as determined by the appended claims when interpreted in accordance with the breadth to which they are fairly, legally, and equitably entitled.

What is claimed is:

1. A transmultiplexer for transmultiplexing a digitized signal sample produced by a converter, comprising:
    a first Fourier transformer coupled to the converter, said first Fourier transformer configured to transform said digitized signal sample produced by the converter into a frequency domain input signal;
    a frequency domain shifter coupled to said first Fourier transformer, said frequency domain shifter configured to frequency shift said frequency domain input signal to produce a shifted signal;
    a frequency domain pre-filter coupled to said frequency domain shifter, said frequency domain pre-filter configured to perform a first fast convolution with said shifted signal and a first discrete Fourier transform of a first filtering function, said frequency domain pre-filter configured to produce a filtered input signal; and
    a combining Fourier transformer coupled to said frequency domain pre-filter, said combining Fourier transformer configured to transform said filtered input signal produced by said frequency domain pre-filter, said combining Fourier transformer configured to produce an output signal containing a sample corresponding to a down-converted channel.

2. The transmultiplexer of claim 1, further comprising an inverse Fourier transformer coupled to said combining Fourier transformer, said inverse Fourier transformer configured to transform said output signal produced by the combining Fourier transformer into a time domain baseband information signal.

3. The transmultiplexer of claim 1, further comprising a frequency domain post-filter coupled to said combining Fourier transformer, said frequency domain post-filter configured to perform a second fast convolution with said output signal and a second discrete Fourier transform of a second filtering function, said frequency domain post-filter configured to produce a post-filter output signal.

4. The transmultiplexer of claim 3, further comprising an inverse Fourier transformer coupled to said frequency domain post-filter, said inverse Fourier transformer configured to transform said post-filter output signal produced by the frequency domain post-filter into a time domain baseband information signal.

5. The transmultiplexer of claim 3, wherein said frequency domain post-filter is configured to perform said second fast convolution with said output signal and said second discrete Fourier transform of said second filtering function in order to provide equalization.

6. The transmultiplexer of claim 3, wherein said frequency domain post-filter is configured to perform said second fast convolution with said output signal and said second discrete Fourier transform of said second filtering function in order to provide matched filtering.

7. The transmultiplexer of claim 1, wherein said a frequency domain shifter comprises:
    a circular shifter configured to receive said frequency domain input signal and alter a frequency of said frequency domain input signal; and
    a phase correction multiplier configured to receive said frequency domain input signal and set the relative phase of said frequency domain input signal.

8. The transmultiplexer of claim 1, wherein said a first Fourier transformer is one of a plurality of Fourier transformers forming a first fast Fourier transformer bank.

9. The transmultiplexer of claim 1, wherein said frequency domain shifter is one of a plurality of frequency shifters forming a frequency domain shift bank.

10. The transmultiplexer of claim 1, wherein said frequency domain post-filter is one of a plurality of frequency domain post-filters forming a frequency domain post-filter bank.

11. A method of transmultiplexing a digitized signal sample produced by a converter, comprising:
    transforming said digitized signal sample produced by the converter into a frequency domain input signal;
    performing a frequency shift of said frequency domain input signal to produce a shifted signal;
    performing a first fast convolution with said shifted signal and a first discrete Fourier transform of a first filtering function to produce a filtered input signal; and
    transforming said filtered input signal to produce an output signal containing a sample corresponding to a down-converted channel.

12. The method of claim 11, further comprising transforming said output signal into a time domain baseband information signal.

13. The method of claim 11, further comprising performing a second fast convolution with said output signal and a second discrete Fourier transform of a second filtering function to produce a post-filter output signal.

14. The method of claim 13, wherein said performing said second fast convolution with said output signal and said second discrete Fourier transform of said second filtering function provides equalization.

15. The method of claim 13, wherein said performing said second fast convolution with said output signal and said second discrete Fourier transform of said second filtering function provides matched filtering.

16. The method of claim 11, wherein performing a frequency shift of said frequency domain input signal to produce said shifted signal; comprises:

altering the frequency of said frequency domain input signal with a circular shifter; and setting a relative phase of said frequency input signal.

17. A multi-channel receiver, comprising:

an antenna configured to intercept electromagnetic radiation within a selected frequency band;

a transducer configured to convert said electromagnetic radiation within said selected frequency band to an analog electrical signal;

an analog signal preprocessor configured to receive said analog electrical signal and produce a conditioned baseband electrical signal;

a converter configured to convert at least a portion of said conditioned baseband electrical signal into digitized signal samples representing said electromagnetic radiation within said selected frequency band;

a commutator configured to distribute portions of said digitized signal samples at a first sampling rate such that a portion of said digitized signal samples are available at a second sampling rate for digital frequency conversion; and a transmultiplexer for transmultiplexing said portions of said digitized signal samples distributed by said commutator; said transmultiplexer comprising;

a first Fourier transformer coupled to said commutator, said first Fourier transformer configured to transform said portions of said digital signal samples distributed by said commutator into a frequency domain input signal;

a frequency domain shifter coupled to said first Fourier transformer, said frequency domain shifter configured to perform a circular frequency shift with said frequency domain input signal to produce a shifted signal;

a frequency domain pre-filter coupled to said frequency domain shifter, said frequency domain pre-filter configured to perform a first fast convolution with said shifted signal and a first discrete Fourier transform of a first filtering function, said frequency domain pre-filter configured to produce a filtered input signal; and a combining Fourier transformer coupled to frequency domain pre-filter, said combining Fourier transformer configured to transform said filtered input signal produced by said frequency domain pre-filter.

18. The multi-channel receiver of claim 17, further comprising an inverse Fourier transformer coupled to said combining Fourier transformer, said inverse Fourier transformer configured to transform said output signal produced by the combining Fourier transformer into a time domain baseband information signal.

19. The multi-channel receiver of claim 17, further comprising a frequency domain post-filter coupled to said combining Fourier transformer, said frequency domain post-filter configured to perform a second fast convolution with said output signal and a second discrete Fourier transform of a second filtering function, said frequency domain post-filter configured to produce a post-filtered output signal.

20. The multi-channel receiver of claim 17, wherein said a frequency domain shifter comprises:

a circular shifter configured to receive said frequency domain input signal and alter the frequency of said frequency domain input signal; and a phase correction multiplier configured to receive said frequency domain input signal and set a relative phase of said frequency domain input signal.

\* \* \* \* \*